United States Patent [19]

Coombes

[11] Patent Number: 4,635,285
[45] Date of Patent: Jan. 6, 1987

[54] COMMUNICATION SYSTEM WITH VOICE PRIORITY FOR REMOTE STATIONS

[75] Inventor: Daniel J. Coombes, Winfield, Ill.

[73] Assignee: Motorola, Inc., Schaumburg, Ill.

[21] Appl. No.: 599,319

[22] Filed: Apr. 12, 1984

[51] Int. Cl.[4] .............................................. H04Q 7/04
[52] U.S. Cl. ...................................... 379/63; 455/33; 379/58; 379/56
[58] Field of Search ............................ 179/2 E-2 EC; 455/33, 53, 54, 56

[56] References Cited

U.S. PATENT DOCUMENTS 3,118,018  1/1964  Cornell .
3,745,462  7/1973  Trimble .
3,955,140  5/1976  Stephens et al. .
4,012,597  3/1977  Lynk, Jr. et al. .
4,082,919  4/1978  Day et al. .
4,103,105  7/1978  Akiyama et al. .
4,131,849  12/1978 Freeburg et al. .
4,312,070  1/1982  Coombes et al. .
4,320,498  3/1982  Justice .

Primary Examiner—Robert G. Lev
Attorney, Agent, or Firm—Raymond A. Jenski; Donald B. Southard

[57] ABSTRACT

A two-way radio communications system of the simplex or half-duplex type having a communication link to a duplex telephone system is provided wherein the simplex or half duplex mobile radio is provided priority to talk upon demand. The communication link is provided without the time delays inherent in conventional systems.

15 Claims, 8 Drawing Figures

COMMUNICATION SYSTEM WITH VOICE PRIORITY FOR REMOTE STATIONS

BACKGROUND OF THE INVENTION

This invention relates to a two-way radio communication system of the simplex or half-duplex type having a communication link to a duplex telephone system. More particularly, the invention relates to such a radio telephone system wherein the simplex or half-duplex remote radio is provided priority to talk upon demand.

In simplex or half-duplex radio systems, the parties must take turns talking. In the duplex telephone system the called and calling parties may both talk and listen simultaneously. In a radio telephone interconnect call the requirement of taking turns to talk presents a problem of establishing the direction of the simplex audio path.

Voice responsive circuitry (VOX) has been employed to control the direction of the simplex audio path in such a radio telephone interconnect call. A simplex transceiver interfacing the simplex radio system with the duplex telephone system typically includes VOX circuitry that controls the simplex audio path direction. When the land party is talking the VOX circuitry enables the transmission to the mobile radio. When the land party stops talking, beep tones can be automatically generated by the VOX circuitry as an alert signal to the operator of the mobile radio that he can now talk.

When the operator on the mobile radio ends his message he can send a beep signal by manual control to similarly alert the telephone party and also to cause the transmitter at the interface transceiver of the radio system to be turned on, readying it for the next message from the telephone party.

VOX circuitry typically includes time delay circuits for maintaining the direction of the audio path during pauses in the land party's message. However, these delay circuits undesirably extend the transmit mode at the completion of the voice message from the land party.

Another major problem with VOX circuitry is the inability to satisfactorily give the mobile radio party priority to talk on demand. One technique, commonly known as periodic sampling, that is used with VOX circuitry for providing the mobile radio party such priority operates as follows. While the land party is transmitting, the received audio is periodically sampled at the simplex transceiver to determine if the mobile radio operator is attempting to talk. When the received audio is being sampled, the transmitter is disabled in the simplex transceiver. Thus, this periodic sampling results in the chopping of the audio tranmission by the land party, thereby producing unsatisfactory audio quality.

There exists a need for a two-way radio communication system of the simplex or half-duplex type having a communication link to a duplex telephone system wherein the simplex mobile radio is provided with priority to talk upon demand. Additionally, it is highly desirable to provide a communication method to eliminate delays inherent in VOX circuitry, and likewise to avoid the periodic sampling technique as employed with VOX circuitry in order to provide the mobile radio party priority to talk on demand.

SUMMARY OF THE INVENTION

Accordingly, it is an object of the invention to provide an improved two-way radio communication system of the simplex or half-duplex type having a communication link to a duplex telephone system wherein the simplex mobile radio is provided priority to talk upon demand.

A related object of the invention is to provide a communication method to minimize time delays in the operation of the communication system.

Briefly, in accordance with the communication method of the present invention, a simplex remote station may transmit a demand-to-talk signal on the control channel while a telephone land party is transmitting on a voice channel. Responsive to this demand-to-talk signal, an audio communications path for transmitting audio from the remote station to the telephone land party is established and a transmission is enabled from the simplex remote station to the telephone land party. At the conclusion of the transmission by the remote station, an end-of-transmission signal is transmitted. An audio communications path for transmitting audio from the telephone land party to the remote station is established responsive to said end-of-transmission signal.

In the preferred embodiment of the present invention, the improved system comprises a common controller, a duplex interconnect station providing a communication link between the duplex telephone system and the radio communication system, and a plurality of simplex remote stations, each comprising means for transmitting a demand-to-talk signal to said common controller on the control channel at any time, including when a land telephone party in the duplex telephone system is transmitting on a voice channel via the duplex interconnect station. The common controller comprises means responsive to the demand-to-talk signal for transmitting a control signal to the duplex interconnect station. The duplex interconnect station comprises means responsive to the control signal for establishing an audio communications path for transmitting audio from the remote station to the telephone land party.

DETAILED DESCRIPTION OF THE PREFERRED EMBODIMENT

Figure 1:
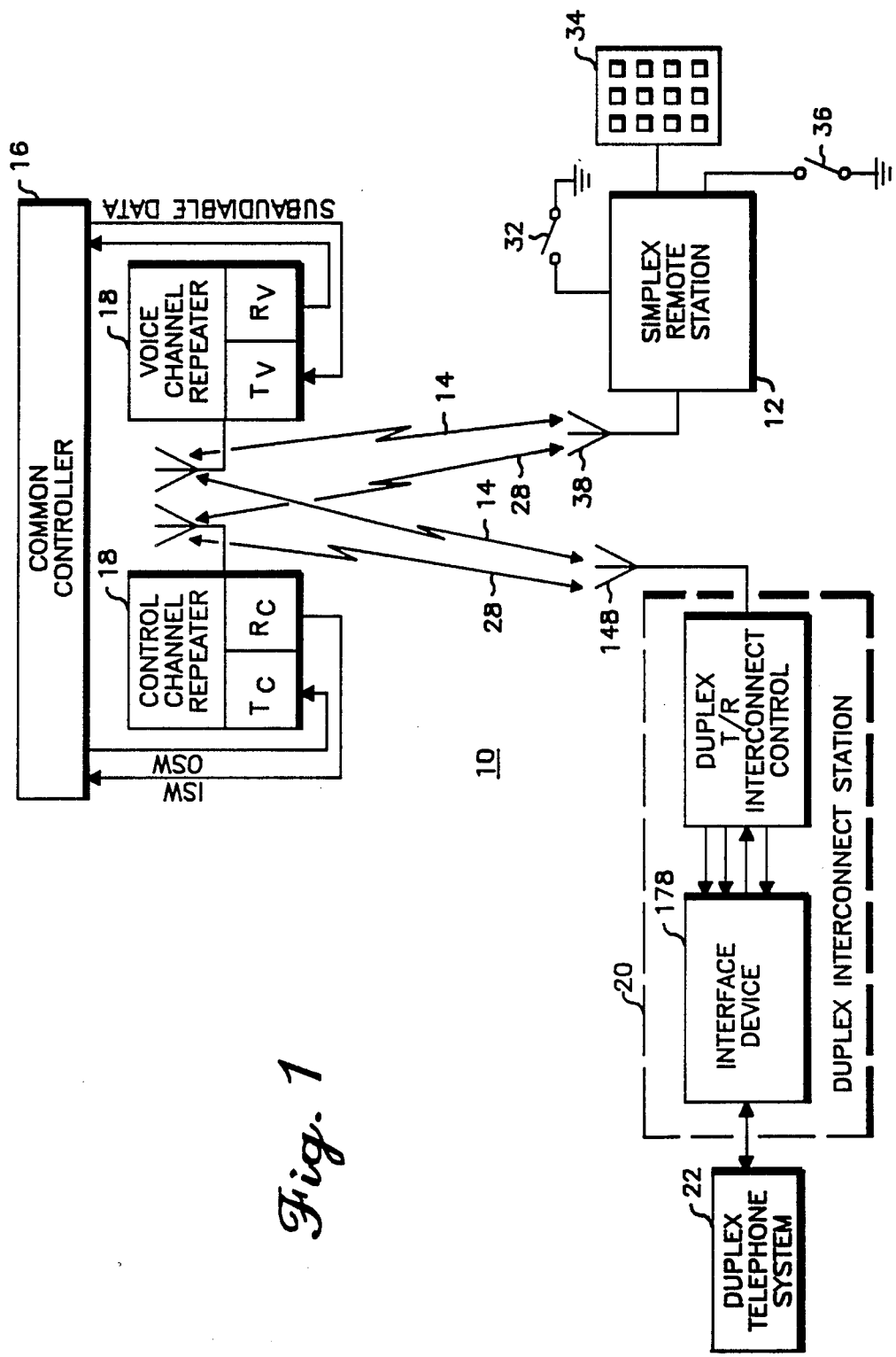
FIG. 1 is a block diagram illustrating the two-way radio communication system having a communication link to a duplex telephone system according to the invention.

Referring to FIG. 1, there is shown a two-way radio communication system according to the invention and designated generally by the reference character 10. Communication system 10 includes a plurality of simplex remote stations 12 (only one is shown) which share a predetermined number of information channels 14. A common controller 16 assigns one of the information channels 14 to a requesting mobile station 12. A plurality of repeaters 18 (two are shown, one for voice and one for control) are provided in conjunction with the common controller 16 corresponding to the predetermined number of information channels 14. Voice channel repeater 18 comprises a transmitter Tv and a receiver Rv. A duplex interconnect station 20 provides a communication link between a duplex telephone system 22 and the two-way radio communication system 10.

One of the information channels 14 is dedicated as a control channel 28 to accommodate signalling between the common controller 16 and the plurality of simplex remote stations 12 and the duplex interconnect station 20. The control channel 28 is used to carry digital data messages from the common controller 16 to both the plurality of simplex remote stations 12 and the duplex interconnect station 20 and likewise from both the plurality of simplex remote stations 12 and the duplex interconnect station 20 to the common controller 16. The corresponding control channel repeater 18, comprised of a transmitter Tc and a repeater Rc, operates in the full duplex mode with both transmitter Tc and receiver Rc active at all times. The technique of signalling over the control channel 28, such as encoding and decoding of information bits, error correction, error detection, and synchronization, will not be described herein in detail. However, a digital encoding and decoding system, such as described in U.S. Pat. No. 4,312,070 issued Jan. 19, 1982 to Coombes et al., and which is assigned to the same assignee as the present invention, may advantageously be employed for such purpose in the present communication system 10.

A highly flexible common controller such as described in U.S. Pat. No. 4,012,597 issued Nov. 24, 1975 to Lynk, Jr., et al., which is also assigned to the same assignee as the present invention, may advantageously be employed for the common controller 16 in the communication system 10 according to the invention. The disclosures of the above-identified U.S. patents are incorporated herein by reference.

The Lynk et al. patent describes a trunked, two-way radio communication system wherein a common controller truncates the channel assignment in response to the conclusion of a transmission, in the case of a transmission trunked system. Alternately, the common controller 16 can truncate the channel assignment on the conclusion of an entire interchange message in the case of a message trunked system. Either message trunking or transmission trunking can be employed in the system 10 according to the invention. Moreover, any two-way radio communication system which includes a control channel to accomodate signalling between a common controller, a plurality of simplex remote stations and a duplex interconnect station may advantageously be employed in the communication system 10 according to the invention.

The common controller 16 preferably includes a microprocessor and associative memory to provide for the control of the operation of the system, such as described in the incorporated disclosure of the Lynk et al. patent. However, the mode of operation deviates therefrom in that two additional control signals are provided for controlling the direction of the simplex audio path between a telephone land party in the duplex telephone system 22 and a simplex remote station 12. The two additional control signals comprise subaudible digital data signals having either an inverted or non-inverted format. Common controller 16 transmits the subaudible digital data control signals on the assigned one of information channels 14 during a radio telephone interconnect call via the transmitter Tv in the corresponding voice channel repeater 18. A subaudible digital data encoder, such as included in a common controller Model T1958A manufactured by Motorola Inc. and described in Instruction Manual 68P1039 E20, may advantageously be employed in the common controller 16.

The duplex interconnect station 20 decodes the subaudible digital data control signals and in response thereto establishes an audio communications path either from the remote station 12 to the telephone land party, or from the telephone land party to the remote station 12. Various protocols may be employed with respect to the subaudible digital data control signals; for example, the inverted or non-inverted format of the subaudible digital data signals may be employed to define the direction of the simplex audio path in the duplex interconect station 20.

Before proceeding to a detailed description of the two-way radio communication system 10, a general description of the system mode of operation in establishing a radio telephone interconnect call will be given as background information to understanding the communication system 10.

A radio telephone interconnect call can be initiated by the remote station 12 or a land telephone party within the duplex telephone system 22. Considering first a call initiated by a remote station 12, the sequence starts with a remote station operator activating a telephone request switch 32. Then the remote station 12 generates an incoming signalling word (ISW) and transmits the ISW interconnect call request on the dedicated control channel 28 to the common controller 16. Control channel repeater 18 is provided in conjunction with common controller 16 to accommodate signalling on control channel 28. The receiver Rc in control channel repeater 18 receives the ISW and transfers the ISW to common controller 16. Common controller 16 decodes the request ISW and assigns an available information channel 14 for the radio telephone interconnect call. Common controller 16 transmits a channel grant outgoing signalling word (OSW) for the radio telephone interconnect call via transmitter Tc in control channel repeater 18 to the requesting remote station 12 and to the duplex interconnect station 20. The channel grant OSW includes a channel assignment signal and a destination address signal corresponding to the identification code signal of both the requesting remote station 12 and the duplex interconnect station 20. The requesting remote station 12 decodes the channel grant OSW and is tuned or switched to the assigned one of information channels 14. Likewise, a transmitter and a receiver in the duplex interconnect station 20 are tuned or switched to the assigned information channel 14 and an off hook signal is provided to the duplex telephone system 22.

A responsive dial tone from the duplex telephone system 22 is transmitted by the duplex interconnect station 20 on the assigned information channel 14 via the corresponding assigned repeater 18 to the requesting remote station 12. The remote station 12 is equipped with a multi-frequency (DTMF) tone dialing set 34 for modulating its transmitter with tone dialing signals. The remote station operator hears the dial tone and then dials the desired telephone number via DTMF tone-dialing set 34. The remote station 12 transmits the tone-dialing signals on the assigned information channel 14 via the corresponding assigned repeater 18 to the duplex interconnect station 20. The tone-dialing signals are coupled via the duplex interconnect station 20 to the duplex telephone system 22.

The simplex remote station 12 reverts to the receive operation mode on the assigned information channel 14 following the transmission of the tone-dialing signals. Both the transmitter and receiver in the duplex interconnect station 20 remain enabled to operate on the assigned information channel 14. Thus, the desired telephone land party is enabled to transmit to the calling remote station 12 and the interconnect call between the land party and remote station operator is established.

For a radio telephone interconect call initiated by a land telephone party, the duplex interconnect station 20 transmits an ISW interconnect call request on the control channel 28 to the common controller 16. The ISW interconnect call request includes a destination address signal corresponding to the identification code signal of the desired remote station 12. In response, common controller 16 transmits a channel grant OSW on the control channel 28 to the desired remote station 12 and the duplex interconnect station 20. The called remote station 12 decodes the OSW and is tuned or switched to the assigned information channel 14. Likewise, the duplex interconnect station 20 is tuned or switched to the assigned information channel 14. The common controller 16 transmits an audible ring signal to the called remote station 12 to notify the operator of the interconnect call. The operator of the called mobile station 12 accepts the call by activating the telephone request switch 32 and is enabled to transmit to the calling land party, and thus the interconnect call between the land party and remote station operator is established.

The preceeding description generally illustrates how an interconnect call is established between a telephone land party in a duplex telephone system 22 and a simplex radio station 12 employing the duplex interconnect station 20. The detailed description which follows addresses the operation of the communication system 10 wherein the remote station 12 is given priority to talk "on demand".

Assume that the simplex remote station 12 is receiving a voice transmission from a telephone land party on the assigned one of channels 14 during a radio telephone interconnect call. The operator of the mobile station 12 may desire to talk prior to the conclusion of an audio transmission by the telephone land party. According to the operation of the communication system 10, the remote operator can talk "on demand" as will be discussed in detail.

The operator of remote station 12 initiates an audio transmission upon demand by manually engaging a push-to-talk (PTT) switch 36. The remote station 12 generates and transmits a demand-to-talk ISW on the control channel 28 to the common controller 16. Common controller 16 decodes the demand-to-talk ISW and transmits a control signal to the duplex interconnect station 20 on the assigned information channel 14. This control signal preferably is a subaudible digital signal which has either an inverted or non-inverted format. An inverted format is used to provide for an audio transmission from the remote station 12 to the land party. In response to the inverted control signal, a remote-transmit land-receive audio path direction is established in the duplex interconnect station 20. The transmitter in the duplex interconnect station 20 is disabled so that a transmission by the telephone land party is prohibited. The receiver in the duplex interconnect station 20 is continuously enabled to operate on the assigned information channel 14 after an interconnect call has been established. Thus, responsive to the inverted control signal output of common controller 16, an audio transmission path from the remote station 12 to the telephone land party is established via the duplex interconnect station 20.

The common controller 16 preferably transmits an acknowledge OSW on the control channel 28 to the remote station 12. The acknowledge OSW indicates that the remote station 12 is within range of the common controller 16 and that the demand-to-talk ISW has been received by common controller 16. The acknowledge OSW additionally provides a channel assignment for a transmission trunked system.

The remote station 12 decodes the acknowledge OSW signal and is tuned or switched to the assigned one of information channels 14. When an acknowledge OSW is not provided in the protocol for the system 10, the remote station 12 reverts to the previously assigned one of information channels 14 immediately following the transmission of the demand-to-talk ISW. Thus, an audio transmission from the remote station 12 to the telephone land party is enabled upon demand by the remote station operator.

Figure 2:
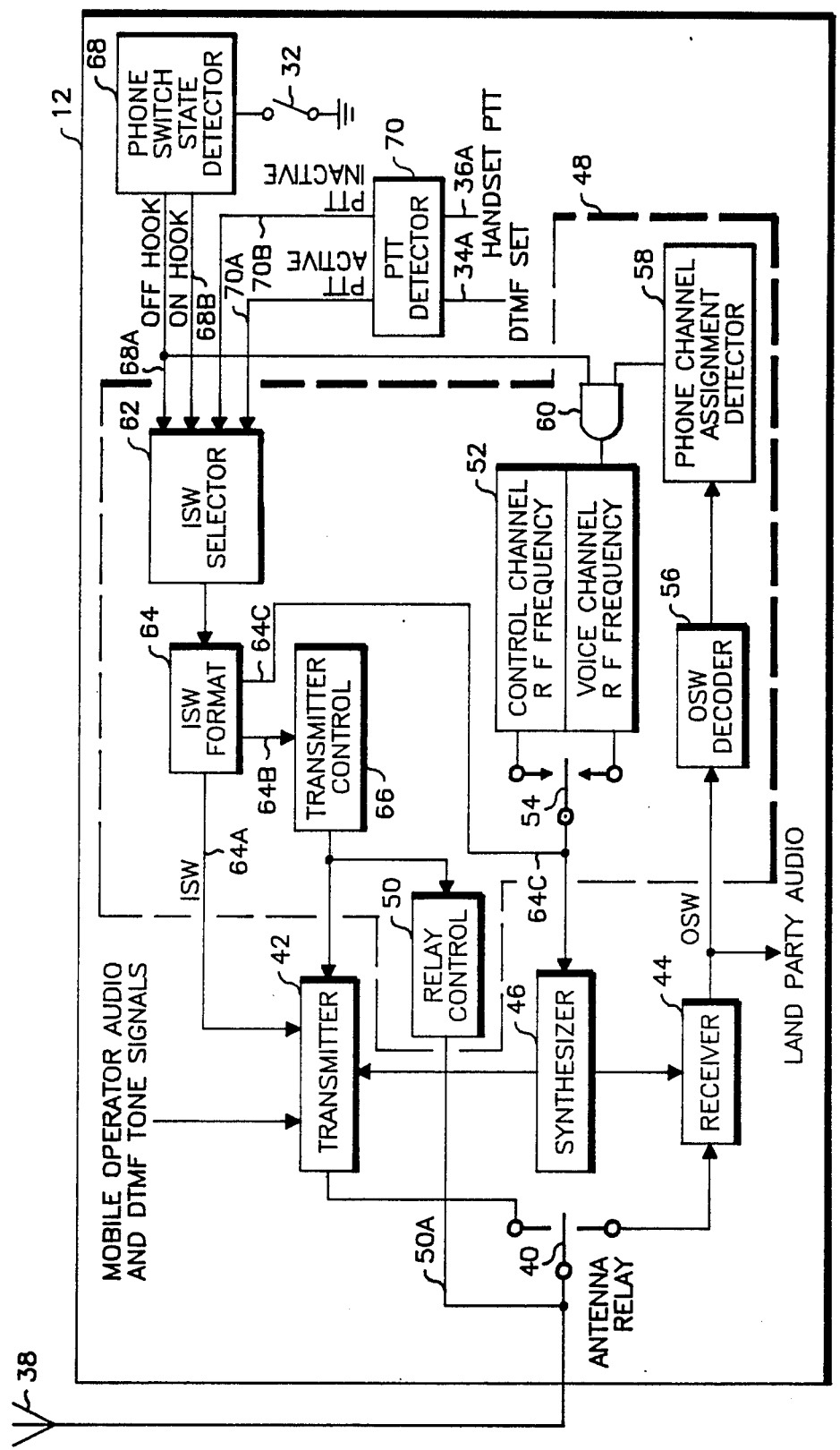
FIG. 2 shows the simplex remote station of FIG. 1 illustrated by functional blocks to clarify its operation.

Referring now to FIG. 2, there is shown a functional block diagram illustrating the simplex remote mobile station 12 of FIG. 1. Identical numbers have been used to indicate the same components.

The simplex remote station 12 includes an antenna 38 coupled via antenna relay 40 to a conventional transmitter 42 or to a conventional receiver 44 to enable simplex operation. A frequency synthesizer 46, also of conventional construction, is coupled to both transmitter 42 and receiver 44 to enable transmitting and receiving on any assigned one of the information channels (14) and on the dedicated control channel (28).

The remote station 12 is provided with control logic 48 including a relay control 50, a frequency programming block 52, a frequency select relay 54, an OSW decoder 56, telephone channel assignment detector 58, an AND gate 60, an ISW selector 62, an ISW format 64 and a transmitter control 66. The frequency programming block 52 is shown as "control channel RF frequency and voice channel RF frequency" in FIG. 2. The specific manner of implementing the functional blocks of the control logic 48 may be by either a hardware implementation or by software executed in a stored program computing means.

The relay control 50 provides an output 50A to control the operation of antenna relay 40 and thereby provide either the receive or transmit mode of operation of the remote station 12.

Figure 3:
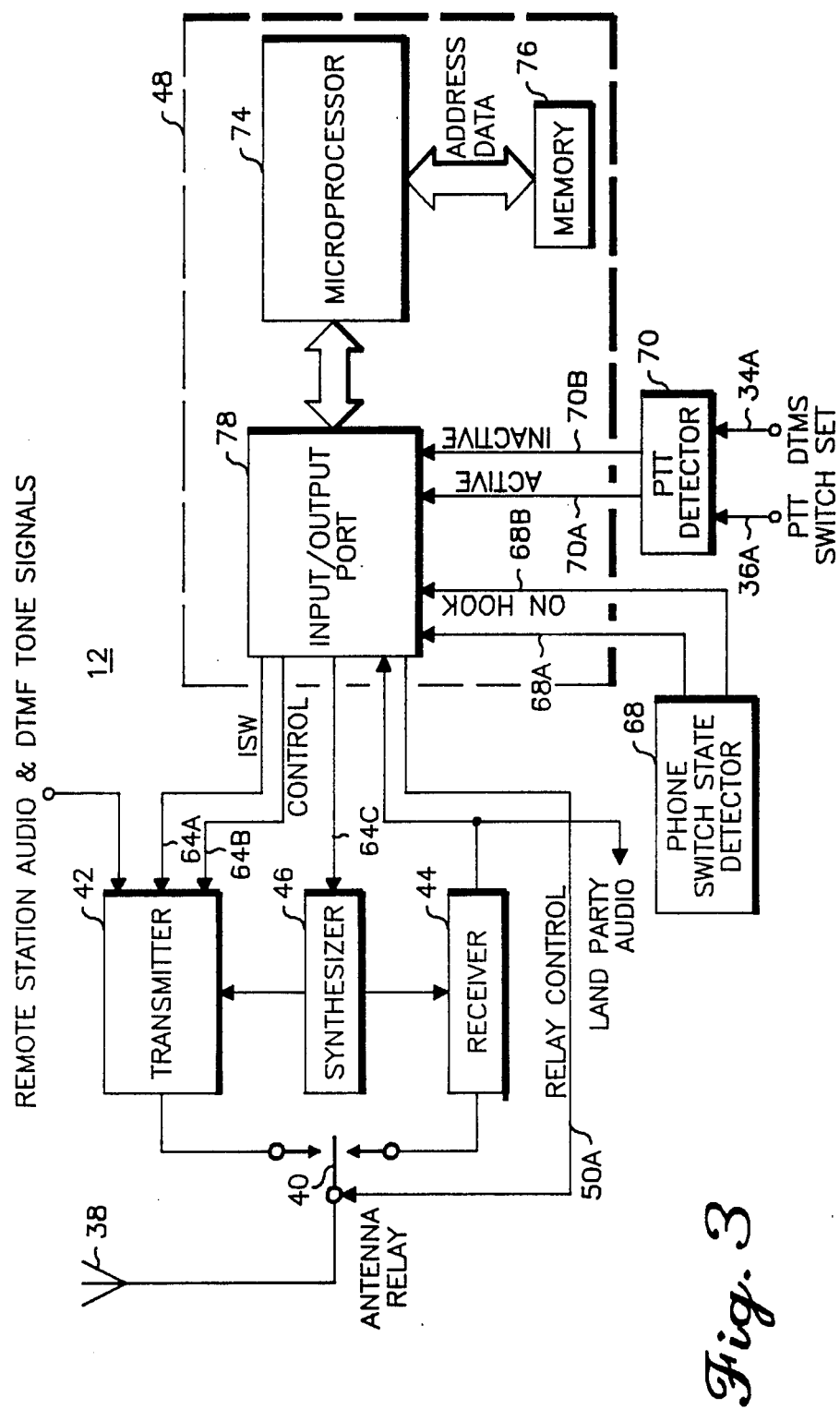
FIG. 3 is a block diagram illustrating a preferred embodiment of the simplex remote station of FIGS. 1 and 2.

The frequency programming block 52 is coupled via relay 54 to the frequency synthesizer 46. The signal 64C switches relay 54 to provide a synthesizer programming signal indicating either the frequency of the control channel (28) or the frequency of the assigned information channel (14) by the controlled operation of relay 54. The OSW decoder 56 is coupled to receiver 44 and decodes signalling from the common controller 16. A decoder, such as shown in FIG. 3 of the incorporated disclosure of the Coombes et al. patent, may be employed to perform the functions of the OSW decoder 56.

The telephone channel assignment detector 58 is coupled to the OSW decoder 56 to detect an assigned information channel (14) for a radio telephone interconnect call. Both the assigned channel signal output of the telephone channel assignment detector 58 and the off-hook signal output of a telephone switch state detector 68 are applied to the AND gate 60. AND gate 60 provides the assigned channel signal to the frequency programming block 52. The frequency programming block 52 is thereby provided the frequency of the assigned one of information channels (14) for an interconnect call. The frequency programming signal is coupled to the synthesizer 46 via relay 54. Frequency synthesizer 46 provides a controlled local oscillator signal to both the receiver 44 and the transmitter 42.

The ISW selector 62 and ISW format 64 are provided for signalling between the remote station 12 and the common controller 16. The ISW selector 62 stores groups of data bits or command words, such as channel assignment request, demand-to-talk, end-of-transmission, etcetera, and selects and sends a particular command word to the ISW format 64 according to the input signals received by the ISW selector 62. The ISW selector 62 receives the off-hook and on-hook signals from the telephone switch state detector 68 and the PTT active and PTT inactive signals from a PTT detector 70.

For example, the ISW selector 62 transfers a demand-to-talk command word to the ISW format 64 upon receiving a PTT active signal that is responsive to the remote operator engaging the PTT switch 36 while an off-hook signal is being provided by the telephone switch state detector 68. The ISW format 64 generates a particular ISW output 64A determined by the data bits provided by the ISW selector 62. An encoder, such as shown in FIG. 2 of the incorporated Coombes et al. patent, may be employed to perform the functions of the ISW format 64. The ISW format 64 provides control signals 64B, 64C to transmitter control 66 and to frequency select relay 54, respectively. The control signal 64B of ISW format circuit 68 is applied to the transmitter control 66 to activate transmitter 42. Relay 54 is operated by the control signal 64C of ISW format circuit 68 to provide the synthesizer programming signal indicating either the frequency of the control channel (28) or the frequency of assigned channel (14) to the frequency synthesizer 48. The relay control block 50 provides a control signal 50A responsive to the output of transmitter control 66 that is applied to antenna relay 40 to enable a transmission from mobile station 12 via the antenna relay 40.

The telephone switch state detector 68 is coupled to the telephone request switch 32 which is manually activated by the remote station operator to establish the radio telephone interconnect call. The remote station operator can terminate the interconnect call by deactivating switch 32. Telephone switch state detector 68 provides off-hook 68A and on-hook 68B signals corresponding to the operation of the telephone request switch 32.

The push-to-talk (PTT) detector 70 is coupled to the PTT switch 36 and to the DTMF tone dialing set 34 to provide a PTT active signal 70A when either the DTMF tone dialing set 34 or the PTT switch 36 is activated, and to provide a PTT inactive signal 70B when both the same are de-activated.

Referring now to FIG. 3, there is shown a block diagram illustrating an alternate embodiment of the simplex remote station 12 of FIGS. 1 and 2. Identical components have been used to indicate the same components.

In this alternate embodiment, the function blocks of the control logic 48 are implemented in the software employed with a microprocessor 74, such as a MC6803 manufactured by Motorola Inc. and an associative memory device 76, such as an EEPROM. An input-output port 78 couples the output of the receiver 44, the on-hook 68B and off-hook 68A signals from the telephone switch state detector 68 and the PTT active 70A and PTT inactive 70B signals from the PTT detector 70 to the microprocessor 74. Responsive to the particular state of each of these input signals, the microprocessor 74 selectively recalls or stores information in the memory 76, selectively generates the ISW output 64A, and provides the control signals 50A, 64B and 64C, as described hereinabove with respect to FIG. 2.

Figure 4A:
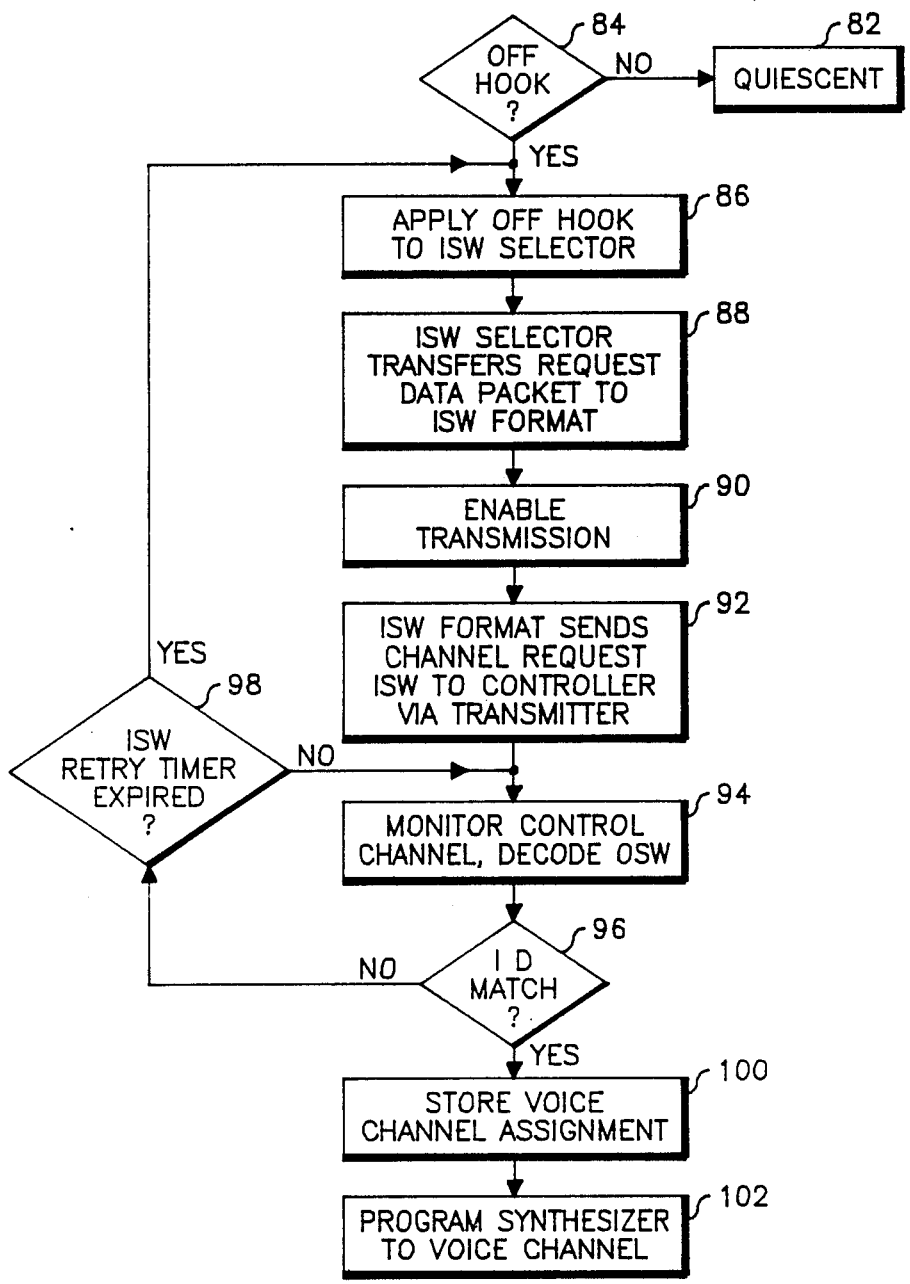
FIG. 4a is a logic flow diagram illustrating the operation of the simplex remote station initiating an interconnect call.

Referring now to FIG. 4a, there is shown a logic flow diagram illustrating how the microprocessor 74 in the control logic 48 may be programmed to control the operation of the simplex remote station 12 of FIGS. 2 and 3 in initiating a radio telephone interconnect call.

The operations within the microprocessor 74 illustrated in the flow diagrams of FIGS. 4a, 4b will be described corresponding to operations of the functional blocks shown in control logic 48 in FIG. 2. Accordingly, such microprocessor operations as, setting or removing an inhibit flag, addressing a memory location, will be described as providing signals by the functional blocks.

The control logic (48) begins in the quiescent or standby mode, as shown in a block 82. In this mode, the outputs of the telephone switch state detector (68) are monitored to detect a request initiated by the radio operator activating the telephone request switch (32). Also, the synthesizer (48) provides the frequency of the control channel (28) to the transmitter (42) and to the receiver (44).

As indicated by instruction 84, a decision is made to determine whether or not the active off-hook signal (68A) is found. If the active off-hook signal (68A) is not detected, the control logic continues in the quiescent mode, as shown in block 82 and continues to monitor the outputs (68A, 68B) of the telephone switch state detector (68) and the control channel (28). When it is determined that an active off-hook 68A signal has been received, the program proceeds to instruction 86 to apply an active off-hook signal (68A) to the ISW selector 62 in FIG. 2. In response to the off-hook signal (68A), the ISW selector (62) transfers a request for an interconnect call channel assignment data packet to the ISW format (64), as indicated by instruction 88. Next instruction 90 enables a transmission, so that the ISW format (64) provides the control signal (64B) to enable the transmitter (42) via the transmitter control (66) which provides the control signal (50A) to antenna relay (40) to enable a transmission. Thereafter, the ISW format (64) sends an interconnect call channel assignment request ISW on the dedicated control channel (28) to the common controller (16) via transmitter (42), as indicated by instruction 92. Following the transmission of the request ISW, the remote station (12) reverts to the receive mode of operation on the control channel (28).

Instruction 94 provides for the next operation of monitoring the control channel (28) for OSW's from the common controller (16) and sequentially decoding the received OSW's. As indicated in a instruction 96, a determination is made as to whether or not the received OSW provides a matching identification signal with the identification signal of the remote station (12) that is stored in the control logic (48). When a match is not found (instruction 96), instruction 98 requires that a determination be made as to whether or not an ISW retry timer has expired. If the ISW retry timer has not expired, monitoring of control channel (28) for an OSW having a matching ID continues (instructions 94, 96). When the ISW retry timer has expired without finding an OSW providing a matching ID, the operation reverts back to instruction 86 to apply an active off-hook signal (68A) to the ISW selector (62), so that the sequential steps are repeated and another request ISW is transmitted to common controller (16).

When a received OSW is found to match the ID signal of the remote station (12) (instruction 96), the OSW is further decoded. The channel assignment for the interconnect call is detected by the telephone channel assignment detector (58). The particular channel assignment is stored in the frequency programming block (52), as indicated by instruction 100.

The next operation is to provide the synthesizer (48) with the control signal (64C) corresponding to the frequency of the assigned voice channel (14), as shown by instruction 102. Thus, an information channel 14 has been assigned for the interconnect call.

Figure 4B:
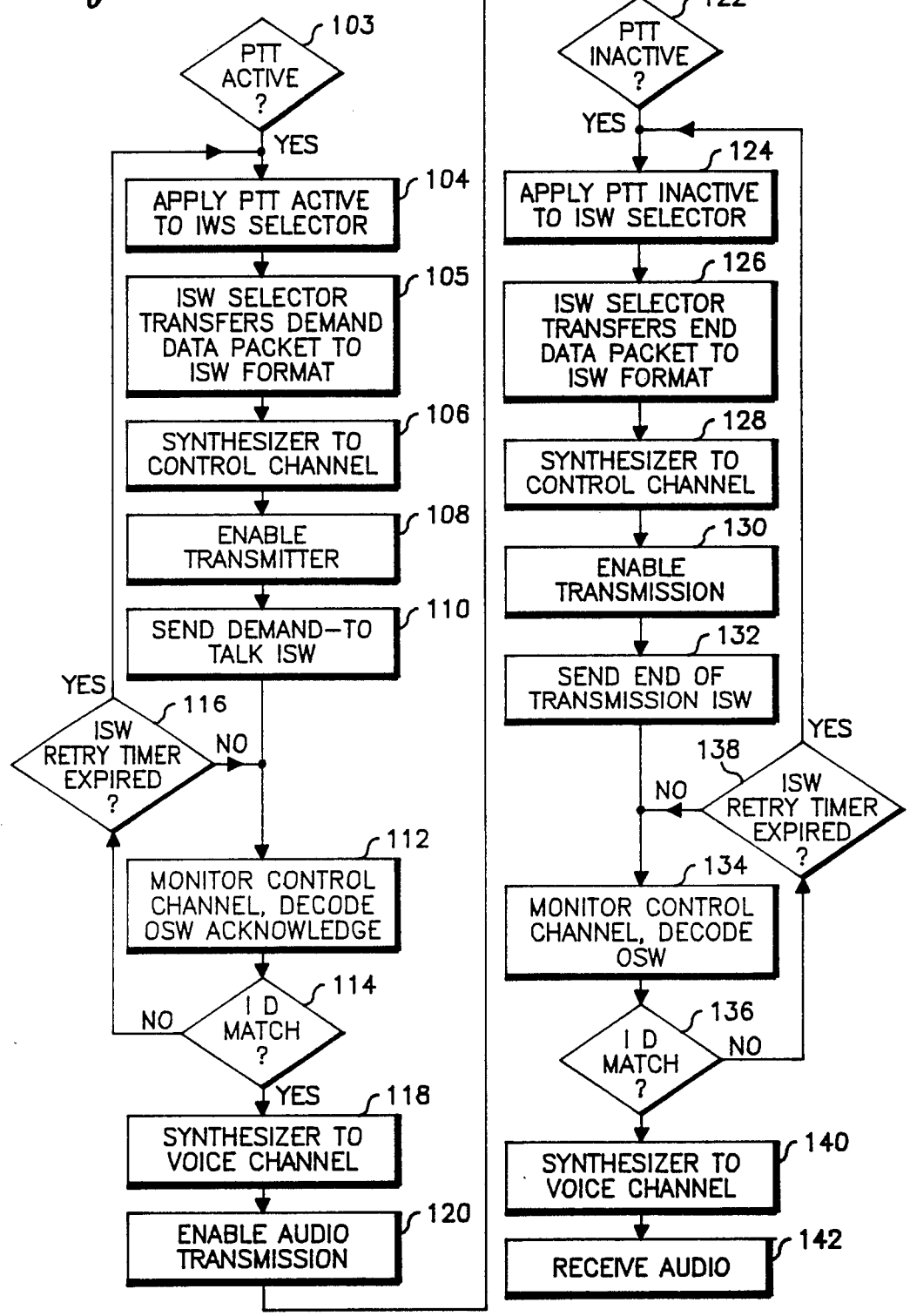
FIG. 4b is a logic flow diagram illustrating the operation of the simplex remote station during an interconect call.

Referring now to FIG. 4b, there is shown a logic flow diagram illustrating how the microprocessor 74 in the control logic 48 may be programmed to control the operation of the simplex remote station 12 of FIGS. 1, 2 and 3 after a radio telephone interconnect call has been established. Referring also to FIGS. 2 and 3, first consider the receive mode of operation of the remote station (12) during an interconnect call. Antenna 38 receives the radiated RF signal of the assigned information channel (14) from the telephone land party and couples the same via antenna relay (40) to the receiver (44). The remote operator may desire to talk prior to the conclusion of the audio transmission by the telephone land party. The operator of the remote station (12) initiates an audio transmission upon demand by manually engaging the PTT switch (36).

As indicated by instruction 103, a decision is made to determine whether or not the PTT active signal (70A) is found. When found, the PTT active signal is provided by PTT detector (70) to ISW selector (62), as indicated in instruction 104. The telephone switch state detector (68) provides an off-hook active signal (68A) to ISW selector circuit (62) for the duration of the radio telephone interconnect call. Instruction 105 causes the ISW selector (62) to provide a demand-to-talk signal to the ISW format (64) in response to the PTT active signal (70A) with the off-hook active signal (68A) present. The ISW format (64) generates a demand-to-talk ISW and control signals. Relay (54) is operated by a control signal (64C) from ISW format circuit (64) to provide the frequency of the dedicated control channel (28) to the frequency synthesizer (48), as indicated by instruction 106. A second control signal (64B) from ISW format (64) is provided to the transmitter control (66) whereby transmitter (42) is keyed or enabled, as indicated by instruction 108. The ISW format (64) sends the demand-to-talk ISW on the control channel (28) to the common controller (16) via the transmitter (42), as shown in instruction 110.

Following the transmission of the demand-to-talk ISW, the remote station (12) may immediately revert to the assigned one of the information channels (14) when an acknowledge OSW is not used in the system protocol for the operation of system (10). However, the use of an acknowledge is preferred in that the remote station (12) receives a positive indication that it is within the range of the common controller (16) and that the particular message has been received by the same.

When using the preferred system protocol wherein common controller (16) provides an acknowledged OSW, following the transmission of the demand-to-talk ISW, instruction 112 causes transmitter (42) to be dekeyed by applying the control signal (64B) to transmitter control (66) and antenna relay (40) to be operated via control signal (50A) to couple the antenna (38) to the receiver (44). Also, the frequency synthesizer (48) continues to provide the frequency of the control channel (28) to both the transmitter (42) and the receiver (44).

Common controller (16) decodes the demand-to-talk ISW and transmits an acknowledge OSW on the control channel (28) to the remote station (12). OSW decoder (56) decodes the acknowledge OSW (as indicated by instruction 112) and compares the destination address with the identification signal of the remote station (12), as indicated by instruction 114. When an ID match is not found (instruction 114), a determination is made as to whether or not the ISW retry timer has expired, as indicated by instruction 116. If the retry timer has not expired, then monitoring of the control channel (28) and comparing the received OSW's for a matching ID signal is continued. When the retry time has expired, the operation reverts to instruction 104 to apply a PTT active signal (70A) to ISW selector (62). Thereby, as described herinbefore, the sequential steps are repeated so that another demand ISW is transmitted to the common controller (16).

When an ID match is found (instruction 114), the OSW decoder (56) provides a signal to the telephone channel assignment detector (58). The telephone channel assignment detector (58) provides the assigned information channel signal to the frequency programming block (52) via AND gate (60). The frequency of the particular assigned channel (14) for the interconnect call is provided by the frequency programming block (52) to the frequency synthesizer (48) via relay (54), as indicated by instruction 118. Next the transmitter (42) is enabled via control signal (64B). An audio transmission is enabled from the operator of the remote station (12) to the telephone land party on the assigned channel (14) after receiving the responsive acknowledge OSW, as indicated by instruction 120. Accordingly, an audio transmission by the operator of the simplex remote station (12) is initiated upon demand by the mobile operator.

The audio transmission by the operator of the remote station is concluded upon the release of the PTT switch (36). The PTT detector (70) provides a PTT inactive signal (70B) in response to the deactivation of PTT switch (36). A decision, as indicated by instruction 122, is made to determine whether or not a PTT inactive signal (70B) is found. When it is determined (instruction 122) that a PTT inactive signal has been received, instruction 124 causes a PTT inactive signal (70B) to be applied to the ISW selector (62). In response thereto, the ISW selector (62) transfers an end-of-transmission data packet to the ISW format (64), as provided by instruction 126. The ISW format (64) provides the control signal (64C) to cause the frequency of the control channel (28) to be applied to synthesizer (48), as indicated by instruction 128. The ISW format (64) provides the control signal (64B) to the transmitter control (66) to enable the transmitter (44), and the responsive control signal (50A) is provided to the antenna relay (40) to enable a transmission, (instruction 130). Next instruction 132 causes the ISW format (64) to send an end-of-transmission ISW via the transmitter (42) to the common controller (16) on the control channel (28).

Following this transmission, a control signal 50A is applied to the antenna relay (40) to enable receiving on the control channel (28). The control channel (28) is monitored and the received OSW's are sequentially decoded, as indicated by instruction 134. The destination address of the decoded OSW is compared with the identification signal of the remote station (12). A decision, as indicated by instruction 136, is made to determine if an ID match has been found. If a match is not found, it is determined whether or not the ISW retry timer has expired, (instruction 138). If the retry timer has not expired, monitoring of the control channel (28) continues (instruction 134). If the retry timer has expired (instruction 138), the operation reverts again to instruction 124 to apply the PTT inactive signal (70B) to the ISW selector (62). The sequential steps, as described hereinabove, are repeated so that another end-of-transmission ISW is transmitted to the common controller (16).

When an ID match is found (instruction 136), instruction 140 causes the control signal (64C) to be applied to operate relay (54) to couple the programming frequency signal of the particular assigned information channel (14) for the interconnect call to the frequency synthesizer (54) from the frequency programming block (52). Instruction 142 causes the receiver to be coupled to the antenna 38 via antenna relay (40) responsive to the control signal (50a). Thus, the remote station (12) is enabled to receive a responsive audio transmission from the telephone land party on the assigned information channel (14), as indicated by instruction 142.

Figure 5:
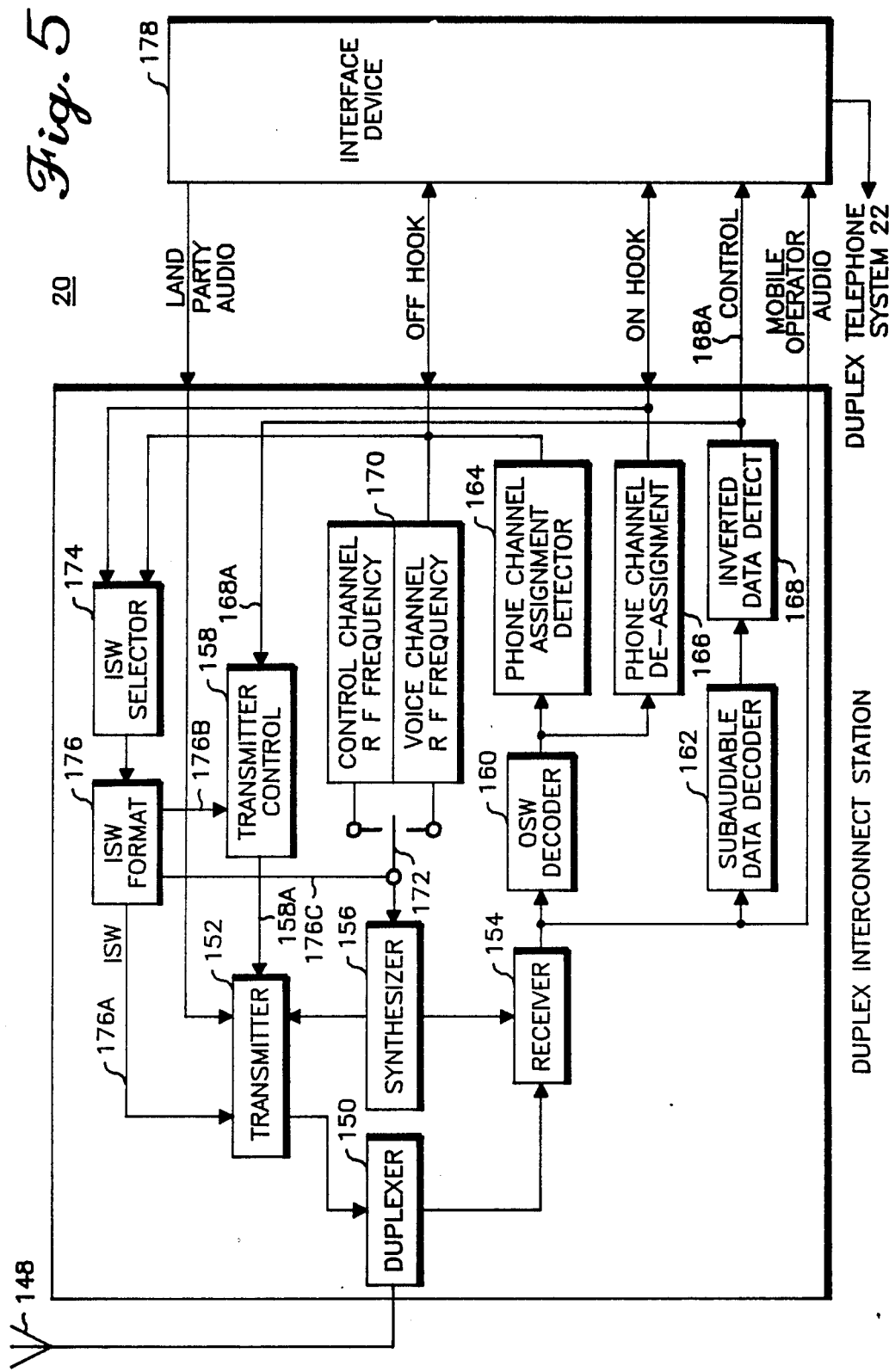
FIG. 5 shows the duplex interconnect station of FIG. 1 illustrated by functional blocks to clarify its operation.

Referring to FIG. 5, there is shown a functional block diagram of the duplex interconnect station 20 of FIG. 1. Identical numbers have been used to indicate the same components.

The duplex interconnect station 20 includes an antenna 148 and a duplexer 150 coupled to a transmitter 152 and to a receiver 154 to enable two-way, duplex operation. A frequency synthesizer 156 is coupled both to the transmitter 152 and the receiver 154 to enable transmitting and receiving on any assigned one of information channels (14) and on the dedicated control channel (28). A transmitter control 158 is provided to enable and disable the transmitter 152.

Control logic including the transmitter control 158, an OSW decoder 160, a subaudible data decoder 162, a telephone channel assignment detector 164, a telephone channel de-assignment detector 166, an inverted data detector 168, a frequency programming block 170, a frequency select relay 172, an ISW selector 174 and an ISW format 176 is provided for system control. The same functional blocks, as used in the control logic 48 of the remote station 12 for providing the functions generally as described hereinbefore with respect to control logic 48, may advantageously be employed to provide the transmitter control 158, the OSW decoder 160, the telephone channel assignment detector 164, the frequency programming block 170, the frequency select relay 172, the ISW selector 174 and the ISW format 176 in the control logic of the duplex interconnect station 20.

The subaudible digital data decoder 162 and the inverted data detector 168 are provided for controlling the direction of the audio path within the duplex interconnect station 20. The audio output of receiver 154 is coupled both to the OSW decoder 160 and the subaudible data decoder 162. The subaudible data decoder 162 decodes the subaudible data signals that are transmitted by common controller 16 on the assigned information channel 14 during an interconnect call. The subaudible digital data decoder 162, such as found in the Syntor X radio and may be provided by filters, such as disclosed in the Instruction Manual for Trunked Syntor X, FM Two-Way Radio no. 68P81043E50-A by Motorola Inc. and logic to compare the received bit stream with a stored bit stream. The subaudible data decoder 162 decodes the subaudible data and provides a signal output to an inverted data detector 168. The inverted data detector 168 provides a control signal 168A to the transmitter control 158. When a noninverted data signal is detected, transmitter 152 is keyed or enabled to transmit via transmitter control 158 on the assigned information channel (14). When an inverted data signal is detected by detector 168, transmitter 152 is dekeyed or disabled via transmitter control circuit 158, responsive to control signal 168A.

The telephone channel assignment detector 164 and the telephone channel de-assignment detector 166 are coupled to the OSW decoder 160. The telephone channel assignment detector 164 provides an assigned channel signal to the frequency programming block 170 and provides an off-hook signal to both the ISW selector 174 and an interface device 178, responsive to the output of OSW decoder 160. The telephone channel de-assignment detector 166 provides an on-hook signal to both the ISW selector 174 and the interface device 178, responsive to the output of OSW decoder 160.

The interface device 178 is employed to couple the duplex interconnect station 20 to the duplex telephone station 22. The interface device 178 preferably comprises a conventional four-wire to a two-wire hybrid. Also a known type of interconnect device including voice responsive circuitry (VOX) may be employed for interface device 178, as in existing systems including such an interconnect device. When interface device 178 includes VOX circuitry, the control signal 168A of the inverted data detector 168 is coupled to the interface device 178 for controlling the direction of the simplex audio path therein.

Figure 6:
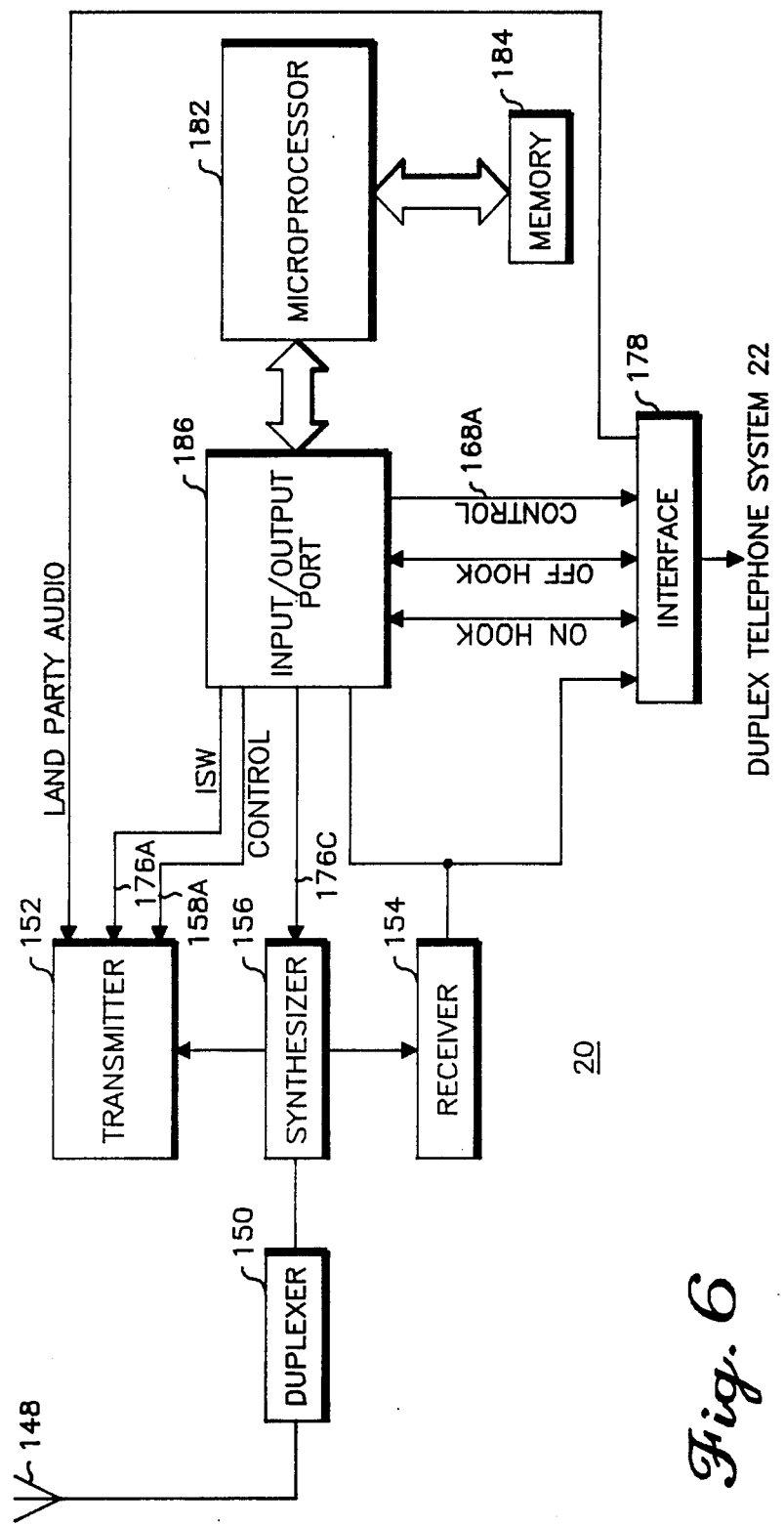
FIG. 6 is a block diagram illustrating a preferred embodiment of the duplex interconnect station of FIGS. 1 and 5.

Referring also to FIG. 6, there is shown a block diagram illustrating an alternate embodiment of the duplex interconnect station 20 of FIGS. 1 and 5. Identical numbers have been used to indicate the same components. A microprocessor 182, such as MC6803 manufactured by Motorola Inc., a memory device 184, such as an EEPROM, and an input output port 186 preferably is employed with software to provide the control logic for the duplex interconnect station 20.

Referring again to FIG. 4a, this logic flow diagram also generally illustrates how the microprocessor 182 in the control logic may be programmed to control the operation of the duplex interconnect station 20 of FIGS. 5 and 6 with a telephone land party initiating a radio telephone interconnect call. The operations are basically the same as described hereinbefore with respect to the microprocessor 74 in the control logic 48 in the simplex remote station 12. The operations within the microprocessor 182 illustrated in the flow diagrams of FIGS. 4a and 7 will be described corresponding to operations of the functional blocks shown in FIG. 5.

The control logic begins in the quiescent or standby mode, as shown in a block 82. In this mode the outputs of the interface device (178) are monitored to detect an off-hook signal. Also, the synthesizer (156) provides the frequency of the control channel (28) to the transmitter (152) and receiver (154).

As indicated by instruction 84, a decision is made to determine whether or not the off-hook signal is found. If the off-hook signal is not found, the control logic continues in the quiescent mode (block 82). When it is determined that an active off-hook signal has been received, the program proceeds to instruction 86 to apply an active off-hook signal to the ISW selector (174).

The ISW selector (174) receives the off-hook signal and in response thereto, transfers a request for channel assignment command word to the ISW format (176), as indicated by instruction 88. Next the ISW format circuit (176) provides the control signal (176B) to enable transmitter (152) via the transmitter control (158), as indicated by instruction 90. Thereafter, the ISW format (176) sends an interconnect call channel assignment request ISW to the common controller (16) on the dedicated control channel (28) via the transmitter (152), as indicated by instruction 92.

Following the transmission of the request ISW, instruction 94 enables monitoring of the control channel (28) for an OSW from the common controller (16) and the received OSW's are sequentially decoded and compared with the identification signal of the duplex interconnect station 20 that is stored in the control logic, memory 184 in FIG. 6 and OSW decoder 160 in FIG. 5. Instruction 96 causes a determination to be made as to whether or not an ID match is found. If a match is not found (instruction 96), instruction 98 requires that a determination be made as to whether or not an ISW retry timer has expired. If the retry timer has not expired, monitoring of the control channel 28 continues (instruction 94). When the retry timer has expired, the program proceeds to instruction 86 to apply an active off-hook signal to the ISW selector (174), so that the sequential steps are repeated and another request ISW is transmitted to common controller (16).

When a received OSW is found to match the ID signal of the duplex interconnect station 20 (instruction 96), the OSW is further decoded. The channel assignment is detected by the telephone channel assignment detector (164). The particular channel assignment is stored in the frequency programming block (170) as indicated by instruction 100.

The next operation is to provide the frequency of the assigned one of the information channel (14) to the frequency synthesizer (156) from frequency programming block (170) via the controlled operation of relay (172), as shown by instruction 102. Thus, an information channel has been assigned for the interconnect call.

Figure 7:
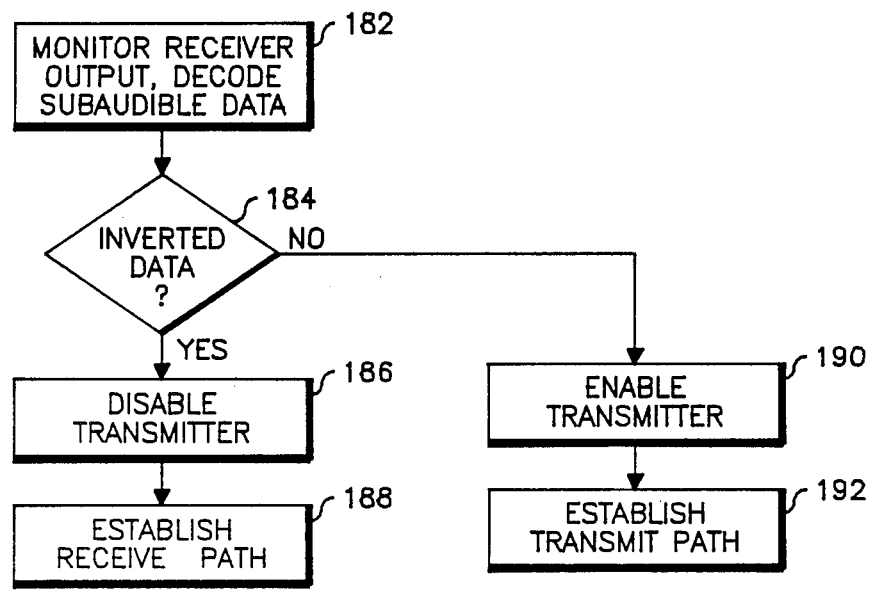
FIG. 7 is a logic flow diagram illustrating the operation of the duplex interconnect station during an interconnect call.

Referring now to FIG. 7, there is shown a logic flow diagram illustrating how the microprocessor 182 may be programmed to control the duplex interconnect station 20 of FIGS. 1, 5 and 6 after a radio telephone interconnect call has been established. Referring also to FIGS. 5 and 6, first consider the remote-transmit and land-receive mode of operation of the duplex interconnect station 20.

Antenna (148) receives the radiated RF signal on the assigned information channel (14) from both the remote station (12) and the common controller (16) and couples the same via duplexer 150 to the receiver (154). The receiver (154) is continuously enabled to receive radiated RF energy from antenna (148) via duplexer (150) during the entire interconnect call.

The subaudible data decoder (162) decodes the subaudible data signals that are transmitted on the assigned information channel (14) by the common controller (16) during the entire interconnect call, as indicated by instruction 182. The subaudible data decoder (162) provides a signal to the inverted data detector (168).

As indicated by instruction 184, a decision is made to determine whether or not the subaudible data signals have an inverted format. If an inverted format is detected (instruction 184), the inverted data detector (168) applies a control signal (168A) to the transmitter control (158) whereby transmitter (152) is disabled, as indicated by instruction 186.

When the conventional type of interface device that includes VOX circuitry optionally is employed, the control signal (168A) would also be applied to the interface device (178) to control the direction of the audio path therein. Accordingly, a mobile-transmit land-receive audio path would be established in the interface device (178) simultaneously with disabling the transmitter (152), responsive to control signal (168A), as indicated by instruction 188. However, where the interface device (178) does not include VOX circuitry, such as when the four-wire to two-wire hybrid is employed, the control signal (168A) and instruction 188 would not be required.

When it is determined (instruction 184) that the subaudible data signals do not have an inverted format, the program proceeds to instruction 190. Instruction 190 causes the transmitter (152) to be enabled via transmitter control (158), responsive to control signal (168A). Optionally as described above, control signal (168A) is applied to the interface (178) to establish a land-transmit mobile-receive audio path therein, as indicated by instruction 192, however in the preferred type of interface device (178) VOX circuitry would not be employed and instruction 192 would not be required.

In summary, the operation of the communication system 10 according to the invention may be understood as follows:

In the land-transmit and mobile-receive audio path direction, the simplex remote station 12 receives a voice transmission from the telephone land party on the assigned information channel 14. The operator of remote station 12 initiates an audio transmission upon demand by manually engaging the PTT switch 36. The remote station 12 generates and transmits a demand-to-talk ISW on the control channel 28 to the common controller 16. Common controller 16 decodes the demand-to-talk ISW and transmits a subaudible inverted data signal on the assigned information channel 14 to the duplex interconnect station 20. The inverted data detector 168 detects the subaudible inverted data signal and provides a signal 168A to transmitter control circuit 158 whereby transmitter 152 is dekeyed. The receiver 154 remains enabled for the duration of the interconnect call in the duplex interconnect station 20. In response to the detected inverted subaudible data signal, a mobile-transmit land-receive audio path direction is established in the duplex interconnect station 20. Restated, a communication path is established for transmitting audio from a mobile station to the telephone land party.

Common controller transmits an acknowledge OSW on the control channel 28 to the remote station 12 in response to the demand-to-talk ISW signal. The remote station 12 decodes the acknowledge OSW as described with respect to FIG. 2 and is enabled to transmit on the assigned voice channel 14. Thus, the operator of the remote station 12 is provided with priority to talk upon demand.

At the conclusion of the audio transmission by the remote station operator, he releases the PTT switch 36 and the remote station 12 transmits an end-of-transmission ISW on the control channel 28 to the common controller 16. In response to the end-of-transmission signal, the common controller 16 transmits an acknowledge OSW on the control channel 28 to the remote station 12 and transmits a non-inverted subaudible signal on the assigned information channel 14 to the duplex interconnect station 20.

The remote station 12 reverts to the receive mode of operation on the assigned information channel in response to the acknowledge OSW. The non-inverted subaudible data signal is detected by the duplex interconnect station 20, and the transmitter 152 (FIGS. 5 and 6) is responsively enabled. Thus, the land party is able to respond to the remote station operator. The remote station operator terminates the interconnect call by de-activating the telephone request switch 32 and the telephone channel de-assignment detector 164 in the duplex interconnect station 20 responsively provides an on-hook signal to the duplex telephone system 22 via the interface device 178 (FIGS. 5 and 6).

In conclusion, a two-way radio communication system of the simplex or half duplex type having a communication link to a duplex telephone system has been described which provides the simplex mobile radio operator with priority to talk upon demand and which eliminates delays inherent in VOX circuitry.

While a preferred embodiment of the invention has been described in detail, it should be understood that many modifications and variations are possible and which may fall within the true spirit and scope of the invention.

What is claimed is:

1. A two-way radio communication system for communicating with a duplex telephone system comprising:
   a common controller;
   a duplex interconnect station providing a communication link between the duplex telephone system and the two-way radio communication system;
   a plurality of simplex remote stations, each having means for generating a demand-to-talk signal for transmission on a control channel to said common controller at any time including the time when a land telephone party in the duplex telephone system is transmitting on a voice channel via said duplex interconnect station;
   said common controller having means responsive to said demand-to-talk signal for transmitting a control signal to said duplex interconnect station, and
   said duplex interconnect station having means responsive to said control signal for establishing a communications path for transmitting audio from the remote station generating said demand-to-talk signal to the telephone land party.

2. A communication system as claimed in claim 1 wherein each of said plurality of simplex remote stations further comprises means for transmitting an end-of-transmission signal on said control channel.

3. A communication system as claimed in claim 2 wherein said common controller further comprises means responsive to said end-of-transmission signal for transmitting an acknowledge signal on said control channel to the simplex remote station and for transmitting a second control signal on the voice channel to said duplex interconnect station.

4. A communication system as claimed in claim 3 wherein said duplex interconnect station further comprises means responsive to said second control signal for establishing a communications path for transmitting audio from the telephone land party to the remote station.

5. A communication system as claimed in claim 1 wherein said common controller further comprises means responsive to a demand-to-talk signal for transmitting an acknowledge signal on said control channel to the simplex remote station.

6. A communication system as claimed in claim 5 wherein each of said plurality of simplex remote stations further comprises means responsive to said acknowledge signal for enabling the remote station to transmit on the voice channel.

7. A two-way radio communication system for communicating with a duplex telephone system comprising:
   a common controller;
   a duplex interconnect station providing a communication link between the duplex telephone system and the radio communication system;
   a plurality of simplex remote stations, each having:
      means for generating a demand-to-talk signal for transmission on a control channel to said common controller while a land telephone party in the duplex telephone system is transmitting on a voice channel via said duplex interconnect station;
      means responsive to an acknowledge signal for enabling the remote station to transmit on the voice channel; and
      means for transmitting an end-of transmission signal on said control channel;
   said common controller having:
      means responsive to said demand-to-talk signal for transmitting both a control signal on said voice channel to said duplex interconnect station and said acknowledge signal on said control channel to said remote station; and
      means responsive to said end-of-transmission signal for transmitting a second control signal on said voice channel to said duplex interconnect station;
   said duplex interconnect station having:
      means responsive to said control signal for establishing a communications path for transmitting audio from the remote station to the telephone land party; and means responsive to said second control signal for establishing a communications path for transmitting audio from the telephone land party to the remote station.

8. A simplex remote station for use in a two-way radio communication system including a control channel for signalling between a common controller and a plurality of simplex remote stations and a duplex interconnect station, with the duplex interconnect station effecting a communications link to a duplex telephone system, said simplex remote station comprising:

means for transmitting a demand-to-talk signal on the control channel to the common controller at any time including the time when a land telephone party in the duplex telephone system is transmitting on a voice channel via the duplex interconnect station; and means for enabling the remote station to transmit on the voice channel responsive to the transmission of said demand-to-talk signal.

9. A simplex remote station as claimed in claim 8 further comprising means for transmitting an end-of-transmission signal on the control channel to the common controller at the conclusion of each transmission by the remote station.

10. A duplex interconnect station for effecting a communications link between a duplex telephone system and a two-way radio communications system which includes a common controller and a plurality of simplex remote stations, said duplex interconnect station comprising:

means for detecting a first control signal generated by the common controller, and, in response thereto, establishing an audio communications path for transmitting audio from a particular remote station to a telephone land party in the duplex telephone system and for simultaneously disabling any transmission by the land party in the duplex telephone system; and means for detecting a second control signal generated by the common controller, and, in response thereto, establishing an audio communications path for transmitting audio from the telephone land party in the duplex telephone system to the particular remote station and for simultaneously enabling a transmission by the telephone land party in the duplex telephone system.

11. A method of controlling the direction of a audio path between a duplex telephone system and a two-way radio communication system which includes a control channel for signalling between a common controller and a plurality of simplex remote stations and a duplex interconnect station, with the duplex interconnect station effecting a communications link on a voice channel to the duplex telephone system, said method comprising:

a. transmitting a demand-to-talk signal on the control channel by a simplex remote station at any time including the time when a telephone land party in the duplex telephone system is transmitting on the voice channel;

b. establishing an audio communications path in the duplex interconnect station for transmitting audio on the voice channel from the remote station to the telephone land party responsive to said demand-to-talk signal; and c. enabling the simplex remote station to transmit on the voice channel to the telephone land party.

12. A method as claimed in claim 11 further comprising the steps of:

generating an end-of-transmission signal at the conclusion of the transmission by the mobile station; and establishing an audio communications path in the duplex interconnect station for transmitting audio from the telephone land party to the remote station responsive to said end-of-transmission signal.

13. The method as claimed in claim 12, wherein the step of establishing an audio communications path in the duplex interconnect station for transmitting audio from the telephone land party to the remote station includes enabling a transmission by the land telephone party.

14. The method as claimed in claim 11 wherein said step of establishing an audio communications path in the duplex interconnect station for transmitting audio on the voice channel from the remote station to the telephone land party includes disabling a transmission by the land telephone party.

15. A method of controlling the direction of a simplex audio path between a duplex telephone system and a two-way radio communication system which includes a control channel for signalling between a common controller and a plurality of simplex remote stations and a duplex interconnect station, with the duplex interconnect station effecting a communications link on a voice channel to the duplex telephone system, said method comprising:

a. transmitting a demand-to-talk signal on the control channel by a simplex remote station while a telephone land party in the duplex telephone system is transmitting on the voice channel;

b. establishing an audio communications path in the duplex interconnect station for transmitting audio on the voice channel from the remote station to the telephone land party responsive to said demand-to-talk signal;

c. transmitting an acknowledge signal on the control channel by the common controller to the simplex remote station;

d. enabling the simplex remote station to transmit audio on the voice channel to the telephone land party responsive to said acknowledge signal;

e. transmitting an end-of-transmission signal on the control channel by the simplex remote station at the conclusion of the audio transmission; and f. establishing an audio communications path in the duplex interconnect station for transmitting audio on the voice channel from the telephone land party to the remote station responsive to said end-of-transmission signal.

* * * * *